United States Patent

Berg et al.

[11] Patent Number: 5,915,271
[45] Date of Patent: Jun. 22, 1999

[54] HEAD/DISC FORCE TRANSDUCER

[75] Inventors: Lowell J. Berg, Minnetonka; Zine-Eddine Boutaghou, St. Paul, both of Minn.

[73] Assignee: Seagate Techology, Inc., Scotts Valley, Calif.

[21] Appl. No.: 08/818,135

[22] Filed: Mar. 14, 1997

[51] Int. Cl.$^6$ .................................................. G01B 5/28
[52] U.S. Cl. ............................................................ 73/105
[58] Field of Search ...................... 73/105, 660, DIG. 4, 73/432 R; 324/212, 235, 252, 319; 360/25

[56] References Cited

U.S. PATENT DOCUMENTS

| | | | |
|---|---|---|---|
| 4,532,802 | 8/1985 | Yeack-Scranton et al. | 73/432 R |
| 5,373,213 | 12/1994 | Smith | 310/355 |
| 5,488,857 | 2/1996 | Homma et al. | 73/105 |
| 5,521,772 | 5/1996 | Lee et al. | 360/75 |
| 5,571,972 | 11/1996 | Okada | 73/862.043 |
| 5,581,021 | 12/1996 | Flechsig et al. | 73/105 |
| 5,640,089 | 6/1997 | Horikawa et al. | 324/212 |
| 5,689,064 | 11/1997 | Kennedy et al. | 73/105 |

*Primary Examiner*—Ronald Biegel
*Attorney, Agent, or Firm*—Westman, Champlin & Kelly, P.A.

[57] ABSTRACT

An apparatus, and method of forming the same, for measuring a head-to-disc contact force in a magnetic disc storage system are disclosed. A slider body of the head has a trailing edge and an air bearing surface. A flexible beam is formed on the slider body at a corner between the air bearing surface and the trailing edge. Contact between the flexible beam and the disc causes deflection of the flexible beam. A degree of deflection of the flexible beam is indicative of the force caused by contact between the head and the disc. The apparatus includes first and second electrical access terminals for use in determining a parameter indicative of the quantity of deflection of the flexible beam and thereby of the force caused by contact between the head and the disc.

18 Claims, 8 Drawing Sheets

HEAD/DISC FORCE TRANSDUCER

BACKGROUND OF THE INVENTION

The present invention relates to force measuring transducers for measuring the force between a magnetic data head and a disc surface in a disc drive data storage system. More particularly, the present invention relates to a micro-force transducer fabricated integrally with a slider body using head processing techniques.

Disc drive data storage systems utilize read/write heads having a slider body which "flies" above a rotating magnetic storage disc. The term "head" typically refers to a combination of the slider and magnetic transducers carried by, or embedded within, the slider. A fundamental problem in head/disc tribology is the lack of understanding of the forces which occur during contact between the head and the disc. During the early phases of contact start-stop (CSS), the force between the head and the disc is fundamentally one of solid-to-solid contact. Asperities on the disc surface interact with asperities on the slider's air bearing surface (ABS) and the entire preload force from the head suspension system is supported through these solid-to-solid contacts between the head and the disc. As the disc comes up to full rotational speed, for a high-flying head design, the preload force from the suspension is supported between the head and the disc through a thin layer of air beneath the ABS of the slider body. The air movement, which is caused by the rotating disc, maintains the head slider flying above the disc.

In proximity contact recording, portions of the head slider are allowed to be in occasional or intermittent contact with the disc surface during a break-in period. As the disc rotates, the intermittent solid-to-solid contact between the head slider and the disc wears down asperities on the head slider and on the disc surface. After the break-in period during which asperities are reduced in size or eliminated, the head slider is controlled in a normal head/disc interface manner with the slider body flying above the disc with minimal contact between the two.

In proximity contact recording, for a new head/disc interface, when the disc is at full speed most of the suspension preload force is supported between the head and the disc through the air bearing film. A small fraction of the suspension preload is supported by solid-to-solid contact between the head and the disc. The lack of understanding of the magnitudes of the solid-to-solid contact forces between the head and the disc during the break-in period is a fundamental problem in proximity contact recording. Frequently, the solid-to-solid contact forces between the head and the disc during proximity contact recording are estimated using simulation programs. In the alternative, piezo-electric materials have been bonded to the top surface of a slider body (opposite the ABS) in an attempt to obtain more information about the forces involved. When the slider body contacts the surface of the disc, a voltage is generated by the piezo-electric material. This gathered information is intended to be used in ABS and disc design. However, in the prior art, there has been no way to correlate the magnitude of the voltage generated to the actual force between the head slider and the disc. Consequently, there is a need for a head/disc force transducer which can provide information on the magnitude of contact forces between the head slider and the disc surface.

SUMMARY OF THE INVENTION

An apparatus, and method of forming the same, for measuring a head-to-disc contact force in a magnetic disc storage system are disclosed. A slider body of the head has a trailing edge surface and an air bearing surface. A flexible beam is formed on the slider body at a corner between the air bearing surface and the trailing edge surface. Contact between the flexible beam and the disc causes deflection of the flexible beam. A degree of deflection of the flexible beam is indicative of the force caused by contact between the head and the disc. The apparatus includes first and second electrical access terminals for use in determining a parameter indicative of the quantity of deflection of the flexible beam and thereby of the force caused by contact between the head anti the disc. In some embodiments, the parameter is a capacitance formed between the flexible beam and a capacitance plate. In other embodiments, the parameter is a resistance of features integrated into the flexible beam.

DETAILED DESCRIPTION OF THE PREFERRED EMBODIMENTS

The present invention includes a technique for measuring the solid-to-solid contact forces between the head and the disc in a disc drive data storage system. To accomplish this, the present invent-ion includes a micro-force transducer fabricated using head processing techniques. The micro-force transducer is preferably fabricated by forming a flexible beam on the trailing edge/ABS corner of a slider body, and thus a deflection sensor on the slider body. The deflection sensor measures the small motions of part of the beam as either changes in capacitance or as changes in resistance. The capacitance or resistance changes can be calibrated to read out the force on the deflecting beam caused by head/disc contact.

Figure 1:
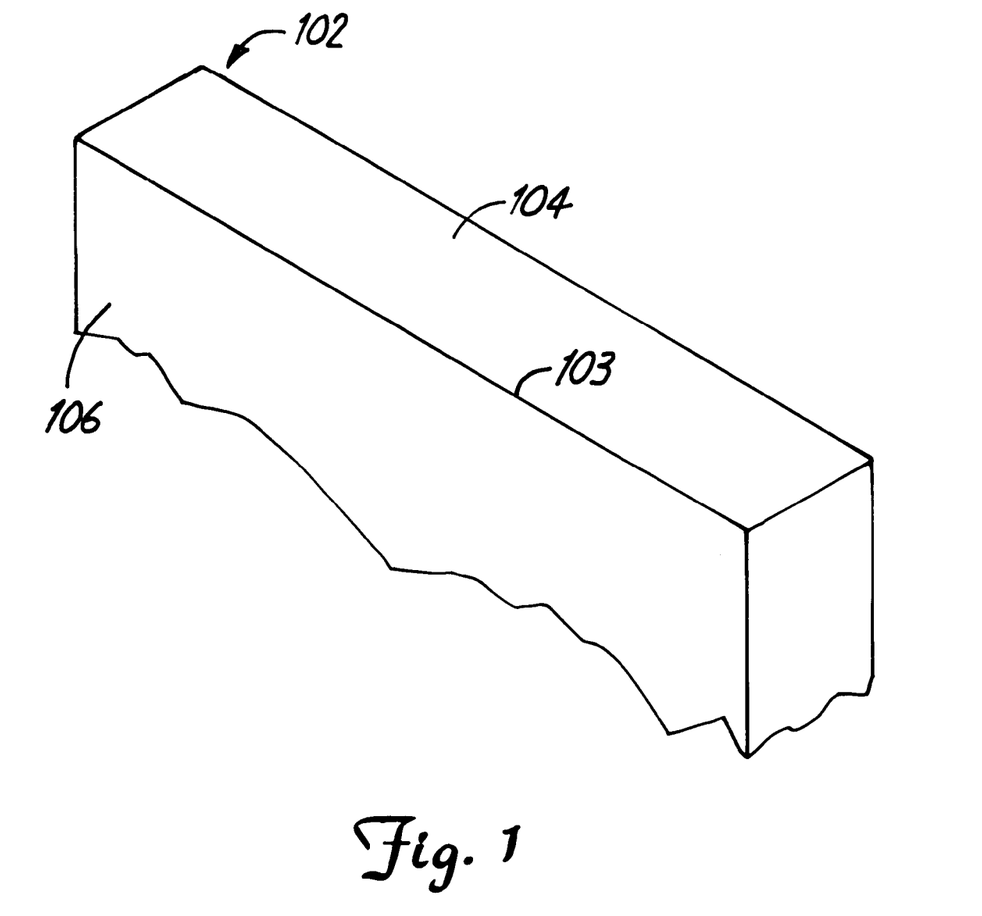
FIG. 1 is a diagrammatic view in perspective of the trailing edge and air bearing surfaces of a slider body to be modified in accordance with the preferred embodiments of the present invention to form a head/disc force transducer.

A preferred method of fabricating the head/disc force transducer of the present invention (hereinafter "force transducer") begins with a standard base-coated slider body substrate. Preferably, this is a wafer substrate having an insulator on top of a ceramic body conductor. FIG. 1 illustrates slider body 102 having trailing edge surface 104 and ABS 106. In preferred embodiments, force transducer 124 (illustrated in a substantially final form in FIGS. 5, 6 and 7) of the present invention will be formed at or near corner 103 between trailing edge 104 and ABS 106. While a method of fabricating force transducer 124 of the present invention is illustrated with reference to a discrete slider body for clarity, it is intended that the force transducer actually be fabricated while the slider body is embedded in a full wafer having a large number of slider bodies.

Figure 2:
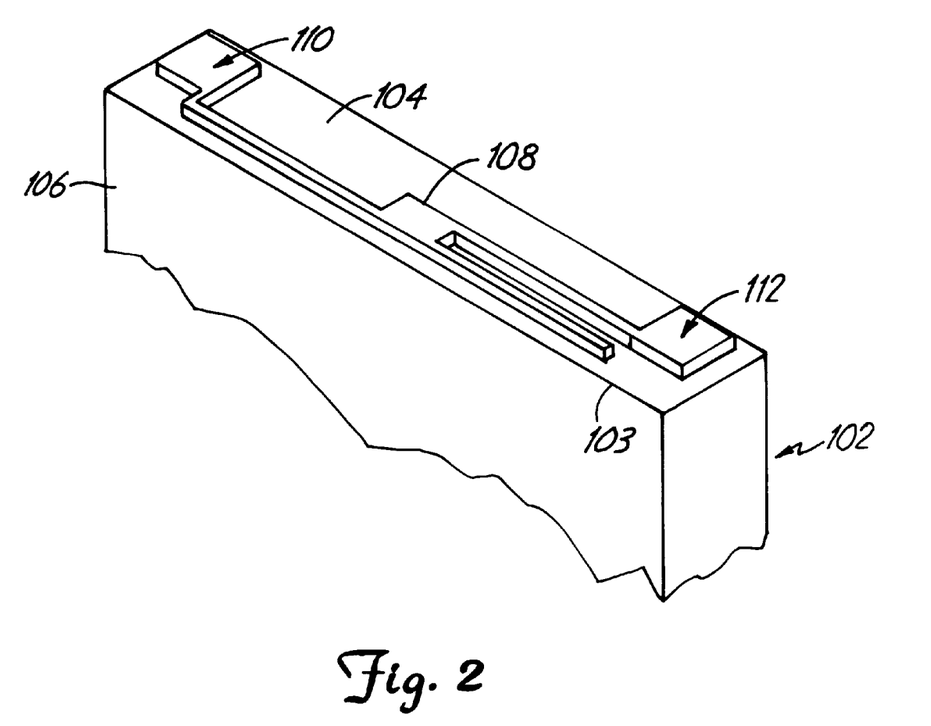
FIG. 2 is a diagrammatic view in perspective of a first step of a method of fabricating the head/disc force transducer of the present invention on the slider body illustrated in FIG. 1.

As illustrated in FIG. 2, a patterned metal layer 108 is plated on trailing edge 104 of the slider, preferably on top of the insulating base coat (base coat not shown for ease of illustration). Metal layer 108 need only be a reasonable conductor material, and must be electrically insulated from the conducting slider body 102. In preferred embodiments, metal layer 108 can be, for example, nickel-iron (NiFe), Sendust™, or copper (Cu). Preferred thicknesses for metal layer 108 are, for example, 10–40 microns.

At the sides of trailing edge 104 of slider body 102 are wiring pads 110 and 112, included in metal layer 108, for making electrical connections to the remainder of the metal layer. In FIG. 2, pads 110 and 112 are shown only in the conducting metal layer for the sake of clarity. However, in preferred embodiments, pads 110 and 112 will be gold-plate for easy wire bonding. In other words, as the layers are built-up during the fabrication of force transducer 124 and slider body 102, the gold pads are added at or near the last step and used to attach wires to metal layer 108. In this manner, capacitance or resistance determining drive circuitry, located off of slider body 102, is connectable to force transducer 124.

Figure 3:
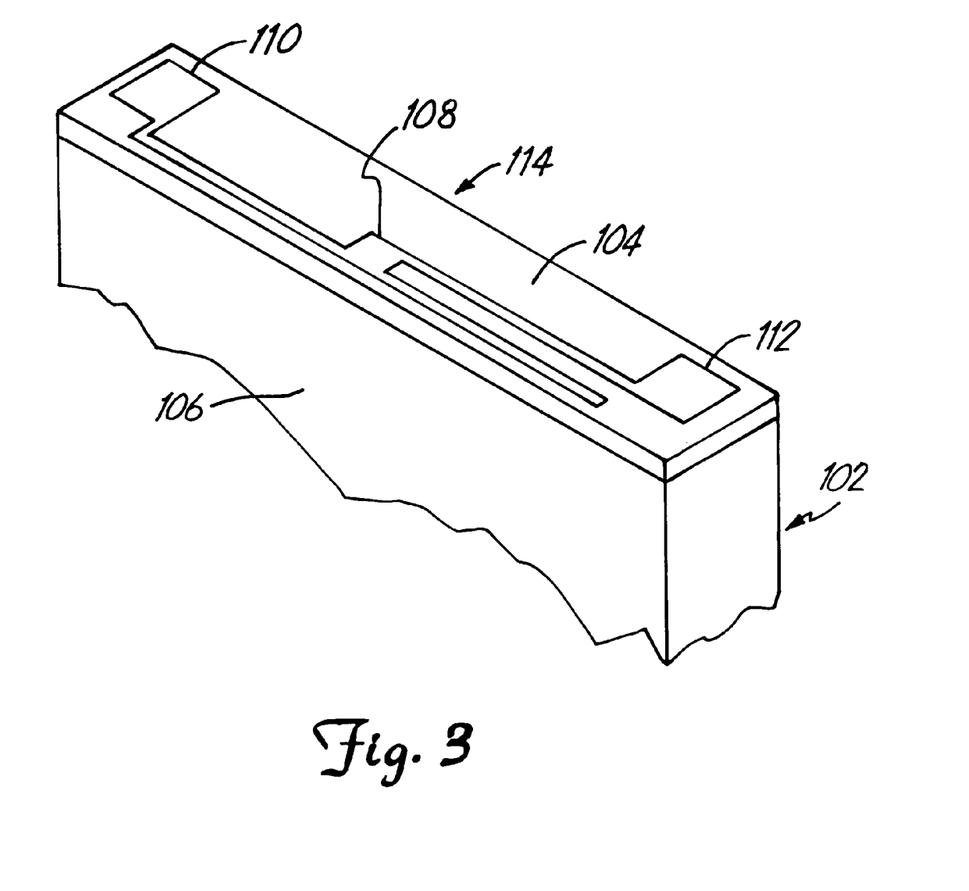
FIG. 3 is a diagrammatic view in perspective of a second step of a method of fabricating the head/disc force transducer of the present invention on the slider body illustrated in FIG. 1.

As illustrated diagrammatically in the perspective view of FIG. 3, after metal layer 108 is plated on trailing edge 104, the wafer is overcoated with alumina (or some other electrical insulator) 114 and then planarized. The overcoat of alumina effectively becomes the new position of trailing edge 104. With the trailing edge surface of alumina overcoat 114 planarized, the slider can be processed at the wafer level using known processes and alignment features which are not relevant to the present invention, and which are therefore not illustrated in the figures.

Figure 4:
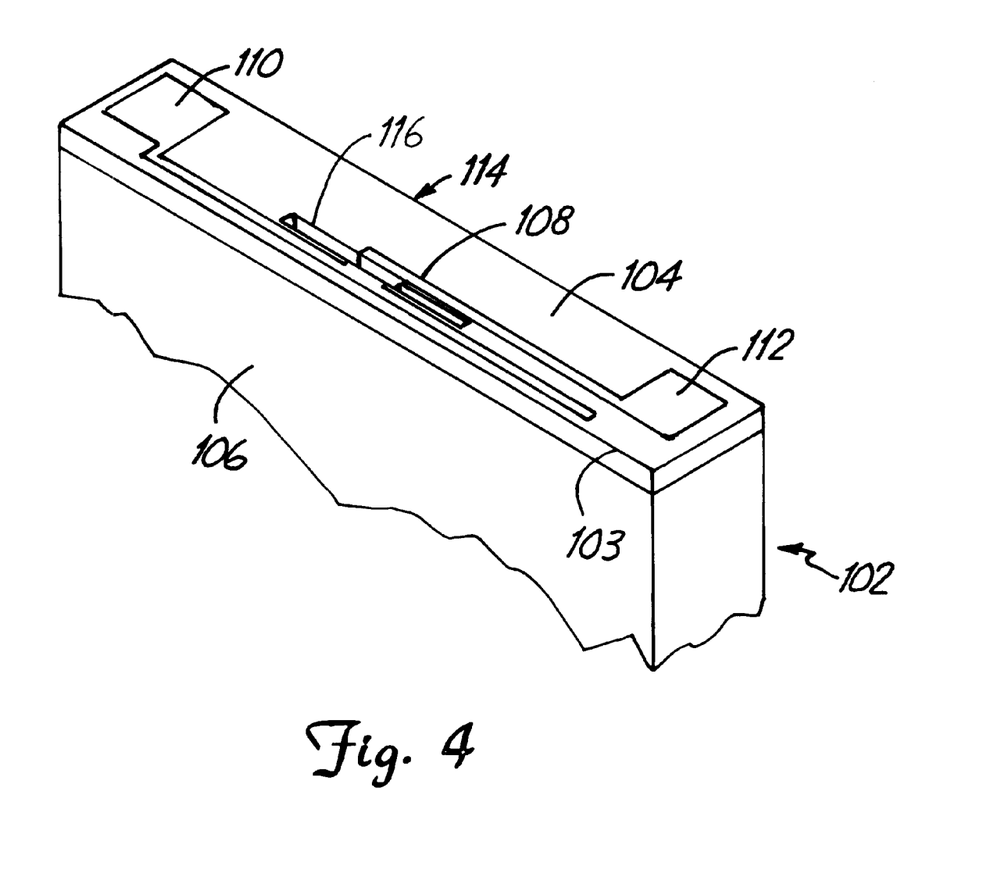
FIG. 4 is a diagrammatic view in perspective of a third step of a method of fabricating the head/disc force transducer of the present invention on the slider body illustrated in FIG. 1.
Figure 5:
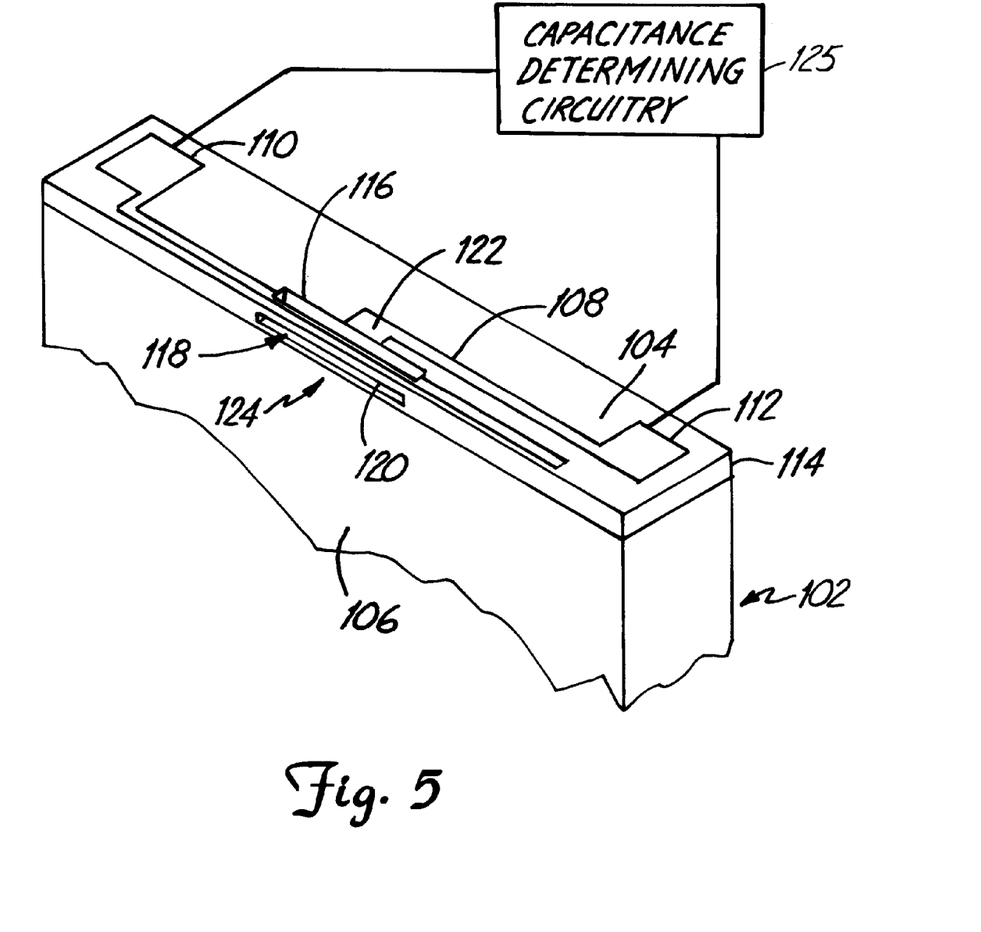
FIG. 5 is a diagrammatic view in perspective of a fourth step of a method of fabricating the head/disc force transducer of the present invention on the slider body illustrated in FIG. 1.

Next, flexible beam 120 (first illustrated in FIG. 5) is formed at trailing edge 104 to act as force transducer 124. This is best illustrated in FIGS. 4 and 5. Beam 120 is formed in trailing edge 104 of the slider body 102 near corner 103. In the embodiment illustrated in the Figures, beam 120 is formed at the center of the slider and is intended to be on the center pad of a conventional proximity slider air bearing. However, the exact location of the beam along corner 103 of the slider is not of particular importance and can be selected to conform to the particular air bearing type.

Figure 6:
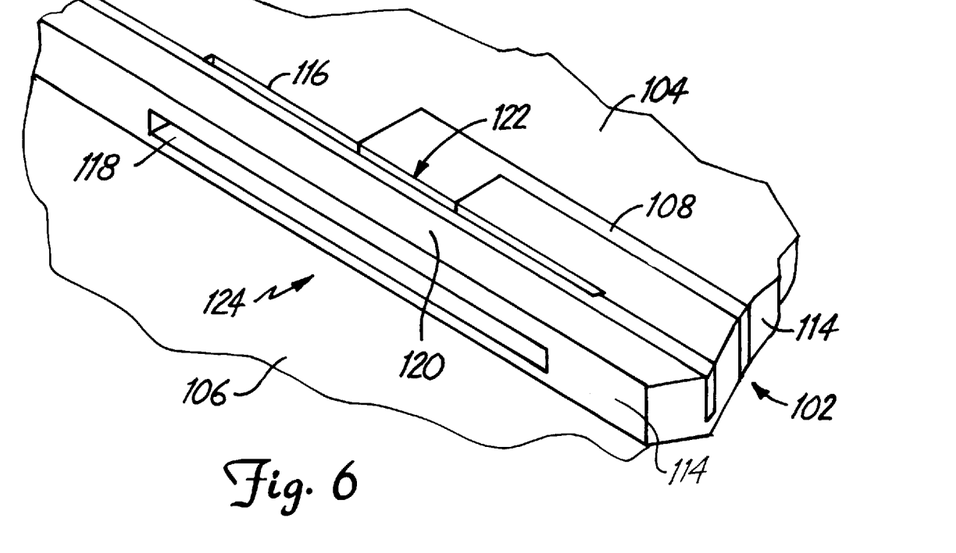
FIG. 6 is a diagrammatic close-up view in perspective of the fourth step of a method of fabricating the head/disc force transducer of the present invention on the slider body illustrated in FIG. 1.

As illustrated in FIG. 4, a first step in freeing beam 120 from the bulk of the head is to mill pocket 116 inward from trailing edge 104 into the slider. Preferably, a focused ion beam (FIB) is used to mill pocket 116. As illustrated in FIG. 5, an FIB mill is also used to form pocket 118 inward from ABS 106. FIG. 6 illustrates a close-up view of force transducer 124 at trailing edge/ABS corner 103 of slider body 102. Preferably, pockets 116 and 218 are formed to be thin as possible. Pocket 116 must be deep enough (i.e., far enough into slider body 102 from trailing edge 104) to completely separate metal layer 108 into two electrically isolated areas, beam 120 and plate 122. Pocket 118 is milled into alumina overcoat 114 and metal layer 108 deep enough to free beam 120 so that it can flex or bend in either of two typically perpendicular directions, a direction parallel to ABS 106 and a direction parallel to trailing edge 104. In other words, beam 120 can bend inward and outward from trailing edge 104 and simultaneously upward and downward from ABS 106.

The portion of beam 120 farthest away (farthest upward) from ABS 106 is a region where the two electrically isolated areas (beam 120 and plate 122) are nearly in contact. In capacitive force transducer embodiments, this area will dominate the capacitance between electrical connection pads 110 and 112. When a force is applied by the disc surface to beam 120 from the ABS side of slider body 102, beam 120 will flex and the spacing will change, thus changing the capacitance between electrical pads 110 and 112 as well. This capacitance change can be sensed using capacitance determining circuitry 125 of the type known in the art which can be coupled to force transducer 124 through pads 110 and 112. With the range of capacitance changes correlated to a range of possible force magnitudes which can be encountered causing the beam to flex, the sensed change in capacitance can be used to measure the solid-to-solid contact forces between the head and the disc. Care should be taken to design the system to make it insensitive to friction forces (forces in the plane of the ABS) acting on beam 120.

Figure 7:
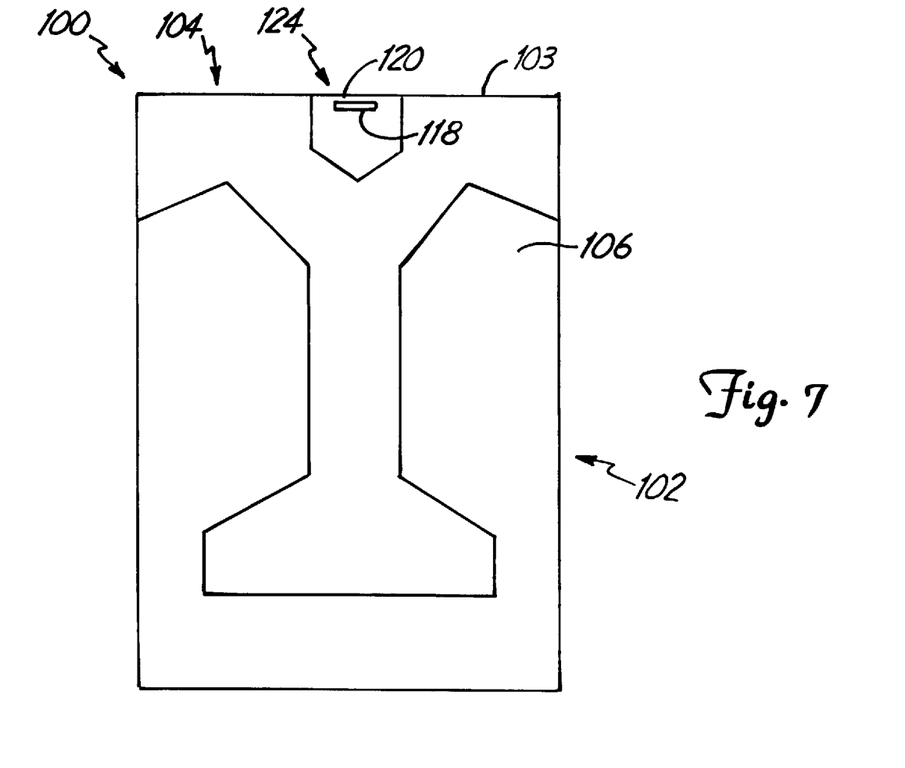
FIG. 7 is a diagrammatic air bearing surface view of a head slider having the micro-force transducer of the present invention formed at the head-slider's trailing edge bearing surface corner.

FIG. 7 is a diagrammatic ABS view of head/disc force measuring apparatus 100. Apparatus 100 can be fabricated as discussed above with reference to FIGS. 1–6 and includes slider body 102 and force transducer 124. Force transducer 124 includes flexible beam 120 formed, at corner 103 between trailing edge 104 and ABS 106, by plating metal layer 108 and subsequently milling pockets 116 and 118 to allow be(am 120 to flex. Capacitance detecting circuitry of the type known in the art can be coupled to transducer 124 through electrical pads 110 and 112. In the alternative, apparatus 100 can be fabricated with the additional teachings of FIGS. 8 and 9 as discussed below such that force transducer 124 can be coupled to resistance determining circuitry 136 (illustrated in FIG. 9) of the type known in the art.

In modern inductive magnetic heads, up to four layers of inductive coils are typically included in the head. Instead of putting a capacitor plate on top of the beam, an electrical resistance strain gauge can be fabricated. A single conductor can be formed to wind back forth along one edge of the beam to increase the sensitivity of the strain gauge. The conductor can be fabricated in the same manner as conventional thin film inductive heads, and can wind back and forth as many times as there are layers in the conventional thin film inductive head process used. After the many conductor layers and vias are plated, and before the alumina overcoat is applied, a process similar to conventional pole trimming processes is used to form a crisp or sharp edge of the strain gauge. Conformal alumina overcoat then forms the bulk of the beam. As discussed above, subsequent FIB milling releases the beam and strain gauge from the rest of the head. There, forces causing the beam to flex cause the length of the conductor to change, resulting in resistance changes. Thus, the forces can be measured by measuring these resulting resistance changes.

Figure 8:
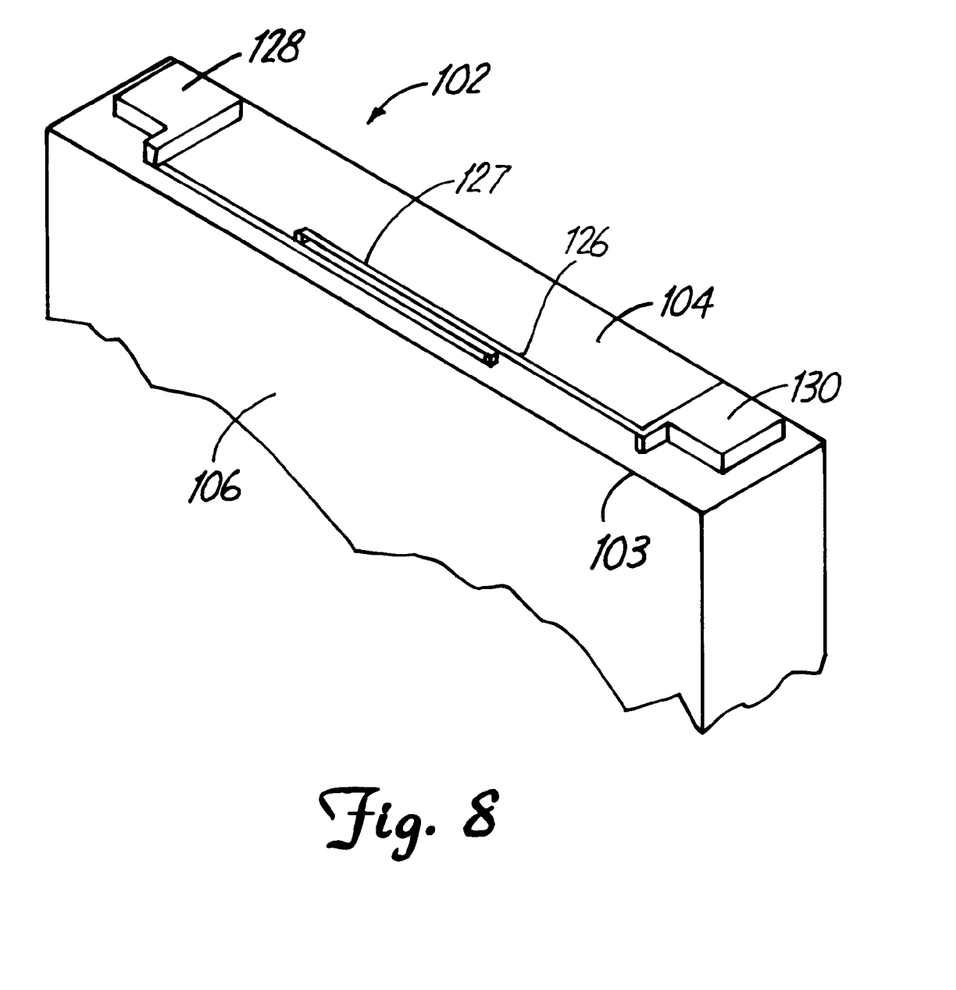
FIG. 8 is a diagrammatic view in perspective of portions of a resistive strain gauge embodiment of the head/disc force transducer of the present invention.
Figure 9:
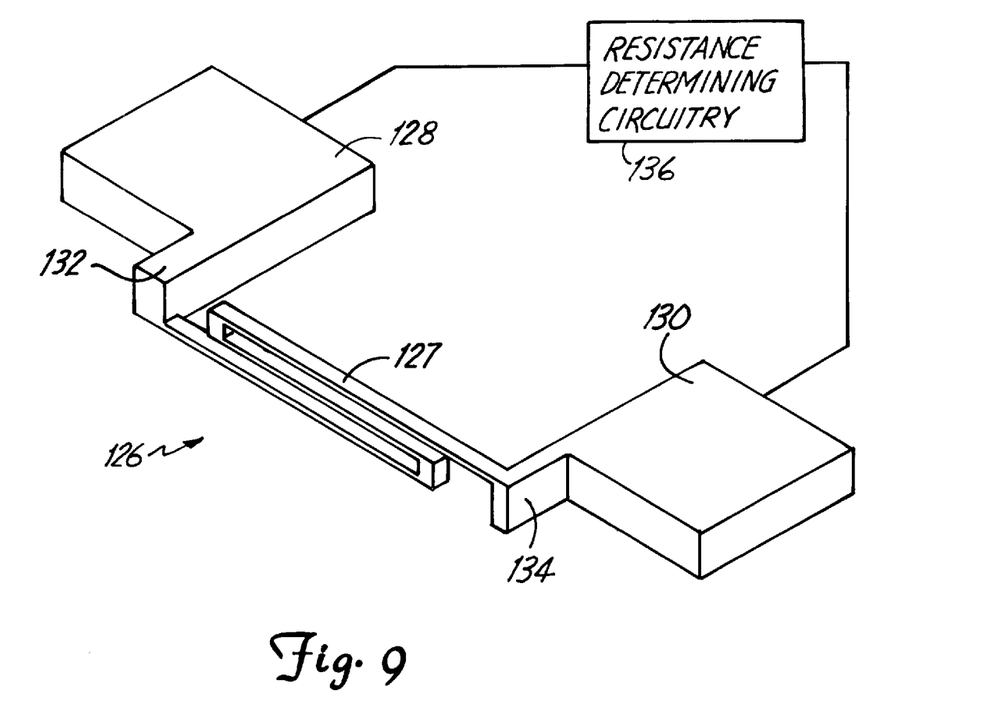
FIG. 9 is a diagrammatic view in perspective of the metal layer of the resistive strain gauge embodiment of the head/disc force transducer illustrated in FIG. 8.

FIGS. 8 and 9 illustrate the relevant changes between the resistive strain gauge force transducer fabrication process from the process illustrated in FIGS. 1–6. As was the case with metal layer 108 in the capacitive force transducer, metal layer 126 is plated on trailing edge 104 of slider body 102. However, plating of metal layer 126 occurs in multiple plating and masking operations to form a serpentine resistor configuration or region 127. Electrical wiring or access pads 128 and 130 are also formed in metal layer 126 and subsequent layers to provide electrical connections to the two ends of serpentine resistor region 127.

The serpentine geometry of metal layer 126 in region 127 causes the conductor to be many times longer than force transducer beam 120 (formed by subsequent FIB milling steps as discussed above). This is consistent with conventional electrical resistance strain gauges. Also, as is known in the resistance strain gauge art, the parasitic resistance of the circuit out of the sensing area should be minimized. This suggests extending fatter lead regions 132 and 134 coming out of wiring pads 128 and 130 toward the active area.

FIG. 9 is a more detailed close-up view of metal layer 126. To better illustrate the serpentine nature of the resistive element, the length scale has been distorted. Also, for clarity, FIGS. 8 and 9 illustrate serpentine region 127 passing only three times over what will eventually be beam 120. However, in preferred embodiments, the number of times that region 127 crosses over the active region of the force transducer (i.e., over beam 120) will be maximized in order to increase the sensitivity of the transducer. The limits to the number of times that serpentine region 127 crosses over beam 120 are primarily related to the capabilities of the thin film processing techniques, to the precision of the ion milling techniques, and to the size of the active area on the air bearing surface portion of the transducer.

The procedures for forming beam 120 in the resistive strain gauge embodiment are the same as discussed above for the capacitive embodiment. Standard thin film photolithographic processing is preferably used. Trailing edge pocket 116 and ABS pocket 118 are once again preferably formed using FIB milling. However, in the resistive strain gauge embodiment, trailing edge pocket 116 not only forms the opening which frees beam 120 such that it can bend, but also defines the thickness of the conductors in the strain gauge. Of course, since a resistance is going to be measured by resistance determining circuitry 136 instead of a capacitance as was the case in the capacitive force transducer embodiment, pocket 116 in trailing edge 104 does not separate metal layer 126 between pads 128 and 130. Instead, pocket 116 serves to free beam 120 so that it can flex in response to head-to-disc contact.

Although the present invention has been described with reference to preferred embodiments, workers skilled in the art will recognize that changes may be made in form and detail without departing from the spirit and scope of the invention.

What is claimed is:

1. An apparatus for measuring a force caused by contact between a head and a disc in a magnetic disc storage system, the apparatus comprising:
   a slider body of the head having a trailing edge and an air bearing surface;
   a flexible member formed in the slider body at a corner between the air bearing surface and the trailing edge, wherein contact between the flexible member and the disc causes deflection of the flexible member, and wherein a degree of deflection of the flexible member is indicative of the force caused by contact between the head and the disc; and
   means for determining a parameter indicative of the quantity of deflection of the flexible member and thereby indicative of the force caused by contact between the head and the disc.

2. The apparatus of claim 1, wherein tile flexible member is a flexible beam, and wherein the parameter is a capacitance between the flexible member and capacitance plate formed on the slider body.

3. The apparatus of claim 2, wherein the means for determining includes first and second bond pads positioned on a surface of the slider body, wherein the first bond pad is electrically coupled to the flexible beam, and wherein the second bond pad is electrically coupled to the capacitance plate formed on the slider body.

4. The apparatus of claim 3, wherein the bond pads are coupleable to capacitance determining circuitry external to the slider body so that the capacitance between the flexible beam and the capacitance plate can be determined, thereby representing a force caused by contact between the head and the disc.

5. The apparatus of claim 4, wherein the flexible beam is formed from a metal layer deposited on the trailing edge of the slider body in combination with a first pocket formed in the air bearing surface and a second pocket formed in the trailing edge, wherein the second pocket separates the metal layer into a flexible beam portion and a capacitance plate portion, and wherein the first and second pockets free the flexible beam portion such that the flexible beam portion can flex in either directions parallel to the air bearing surface or in directions parallel to the trailing edge.

6. The apparatus of claim 1, wherein the flexible member is a flexible beam, and wherein the parameter is an electrical resistance associated with conductors affixed to the flexible beam.

7. The apparatus of claim 6, and further comprising first and second bond pads positioned on a surface of the slider body, wherein the first and second bond pads are electrically coupled to first and second ends of a resistor formed on the flexible beam.

8. The apparatus of claim 7, wherein the resistor formed on the flexible beam has a serpentine configuration such that a length of the resistor is greater than a length of the flexible beam.

9. The apparatus of claim 8, wherein the flexible beam is formed from a metal layer plated on the trailing edge of the slider body in combination with a first pocket formed in the air bearing surface and a second pocket formed in the trailing edge, wherein the first and second pockets free the flexible beam such that the flexible beam can flex in either directions parallel to the air bearing surface or in directions parallel to the trailing edge.

10. A force transducer for measuring a force caused by contact between a slider body and a disc in a magnetic disc storage system, the force transducer comprising:
    a flexible beam formed at the trailing edge of the slider body proximate the air bearing surface, wherein an amount of deflection of the flexible beam caused by contact between the slider body and the disc is indicative of the force caused by contact between the slider body and the disc; and
    a capacitance plate formed proximate the flexible beam, wherein deflection of the flexible beam caused by contact between the slider body and the disc causes a change in capacitance between the flexible beam and the capacitance plate such that the change in capacitance is indicative of the force caused by contact between the slider body and the disc.

11. The force transducer of claim 10, and further comprising a first electrical access terminal coupled to the flexible beam and a second electrical access terminal coupled to the capacitance plate such that the change in capacitance between the flexible beam and the capacitance plate can be detected between the first and second electrical access terminals.

12. The force transducer of claim 11, wherein the flexible beam and the capacitance plate are formed in a metal layer deposited on the trailing edge of the slider body.

13. The force transducer of claim 12, and further comprising a first pocket formed at the air bearing surface and a second pocket formed at the trailing edge, wherein the second pocket separates the metal layer into the flexible beam and a capacitance plate, and wherein the first and second pockets free the flexible beam such that the flexible beam can flex in response to contact between the slider body and the disc.

14. A force transducer for measuring a force caused by contact between a slider body and a disc in a magnetic disc storage system, the force transducer comprising:

a flexible beam formed at the trailing edge of the slider body proximate the air bearing surface, wherein an amount of deflection of the flexible beam caused by contact between the slider body and the disc is indicative of the force caused by contact between the slider body and the disc; and a resistor formed on the flexible beam, wherein deflection of the flexible beam caused by contact between the slider body and the disc causes a change in resistance of the resistor such that the change in resistance is indicative of the force caused by contact between the slider body and the disc.

15. The force transducer of claim 14, and further comprising first and second electrical access terminals coupled to the resistor such that the change in resistance can be detected between the first and second electrical access terminals.

16. The force transducer of claim 15, wherein the resistor is formed in at least one metal layer deposited on the trailing edge of the slider body.

17. The force transducer of claim 16, wherein the resistor has a serpentine configuration such that a length of the resistor is greater than a length of the flexible beam.

18. The force transducer of claim 17, and further comprising a first pocket formed at the air bearing surface and a second pocket formed at the trailing edge, wherein the first and second pockets free the flexible beam such that the flexible beam can flex in response to contact between the slider body and the disc.

* * * * *

UNITED STATES PATENT AND TRADEMARK OFFICE
CERTIFICATE OF CORRECTION

PATENT NO. : 5,915,271
DATED : June 22, 1999
INVENTOR(S) : Lowell J. Beg, et. al.

It is certified that error appears in the above-identified patent and that said Letters Patent is hereby corrected as shown below:

Col. 5, line 59, before "flexible" insert --electrically charged--.

Signed and Sealed this

Fourteenth Day of December, 1999

Attest:

Q. TODD DICKINSON

*Attesting Officer*   Acting Commissioner of Patents and Trademarks